United States Patent [19]

Reynolds

[11] 4,219,697
[45] Aug. 26, 1980

[54] AUTOMATIC REMOTE OPERATE CIRCUIT

[75] Inventor: Perd L. Reynolds, Melrose Park, Ill.

[73] Assignee: GTE Automatic Electric Laboratories Incorporated, Northlake, Ill.

[21] Appl. No.: 972,169

[22] Filed: Dec. 21, 1978

[51] Int. Cl.² .......................................... H04M 11/00
[52] U.S. Cl. ................................................ 179/2 A
[58] Field of Search ................. 179/2 R, 2 A, 2 AM, 179/84 R; 178/4.1 R; 340/310 R, 310 A, 147 R

[56] References Cited

U.S. PATENT DOCUMENTS

| | | | |
|---|---|---|---|
| 3,485,952 | 12/1969 | Walker | 179/2 A |
| 3,532,822 | 10/1970 | O'Hanlon | 179/2 A |
| 3,723,656 | 3/1973 | Curtis et al. | 179/2 A |

FOREIGN PATENT DOCUMENTS 1117045  6/1968  United Kingdom .................... 179/2 A Primary Examiner—James W. Moffitt
Assistant Examiner—Joseph A. Popek
Attorney, Agent, or Firm—Robert J. Black; Charles A. Doktycz

[57] ABSTRACT

A device for the remote turn on of a teletypewriter of a distant terminal, such as at a hotel or motel. The turn on circuit is connected to the communication line to operate a magnetically latching relay. The latching relay operates to turn on the alternating current motor. The relay remains in its operated position until turned off by the end of message detector.

2 Claims, 3 Drawing Figures

AUTOMATIC REMOTE OPERATE CIRCUIT

BACKGROUND OF THE INVENTION

1. Field of the Invention

The present invention relates to a remote control system for the transmission of data, and more specifically for distant control of telegraphic reception equipment.

2. Description of the Prior Art

There are at present two commonly used methods of turning on a teletypewriter from a remote location. These two methods are: the use of a data modem on a switched telephone circuit; and the use of a private direct current loop line with a relay operated from rectified 30 cycle ringing super-imposed onto the direct current loop. The use of a data modem provides the required control but involves the use of complicated and sensitive equipment at both ends of the line. The second method is relatively simple and has found wide usage in Time and Charges Telephone Billing Systems among hotels and motels.

In this latter system an answer relay is operated by rectified 30 cycle ringing current which is superimposed on the direct current loop. A make contact on the relay applies 117 volts of AC to operate a connect relay. The connect relay has a holding path through its own make contacts and disconnects the ring relay with a break contact arrangement. The 117 volt AC connect relay, upon operation, applies the start and operate current to the teletypewriter motor.

The motor is disconnected by a momentary interruption of the Connect Relay Coil Circuit by means of the normally closed contacts of "Slot 29". These contacts are operated by the EOT (end of transmission) coding and the Teletypewriter logic. This is a straight forward circuit requiring relatively large relays because of the contact current requirements.

The sensitivity of the present circuit is limited by available relays to meet the required parameters. The high make and break currents cause false characters known as "hits" on the line. These momentary errors are often evident at the beginning of a message. The standard' relays require regular maintenance procedures.

A momentary loss of AC power, which sometimes occurs, causes the present relay circuit to drop out. Then the motor does not restart until another ring through. However, the message has been terminated.

Accordingly, an object of this invention is to provide a control arrangement that is more sensitive for use on longer transmission loops and that is insensitive to interruptions in commercial AC power at the remote locations.

SUMMARY OF THE INVENTION

Briefly, these and other objects are achieved in accordance with the invention by the use of a bistable relay having a first stable state during which its operated contacts connect the commercial power to the teletypewriter motor and a second stable state during which its contacts are unoperated.

The ringing current detection is performed with the use of a semi-conductor switch to operate the relay to its first stable state upon the detection of ringing current on the communication line.

BRIEF DESCRIPTION OF THE DRAWING

The structure and operation of this invention may be better understood from the following description given in connection with the accompanying drawing, in which.

DESCRIPTION OF THE PREFERRED EMBODIMENT

Figure 1:
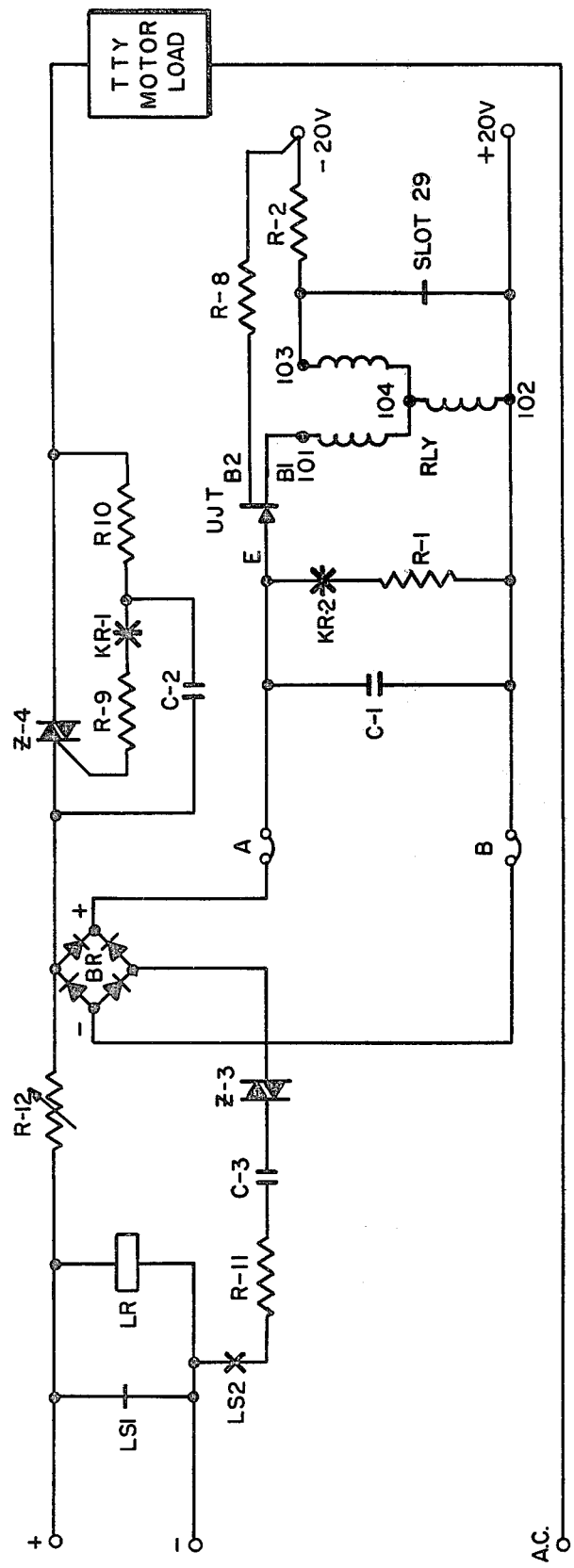
FIG. 1 shows in schematic form a preferred embodiment of the circuit of the invention.

A preferred embodiment of the invention is shown in FIG. 1. This figure shows the circuit at a remote teletypewriter installation. The data line from the telephone exchange is connected to the two terminals at the left of the figure labeled + and − respectively. The commercial power for operating the alternating motor of the teletypewriter is connected across the terminals labeled + and AC. In teletypewriter circuitry the + side is considered the ground side.

The contacts LS1 and LS2 are part of a manual operated switch on the teletypewriter used by maintenance personal to disable the terminal. The box labeled LR a line relay is also part of the teletypewriter and is operated from the control line in the presence of a direct current.

During normal usage the + line circuit is passed through a current adjusting rheostat R12 to the rectifier bridge BR, the voltage limiter Z3, capacitor C3, resistor R11 and contacts LS2 to the − line conductor.

Upon the application of ringing current to the line, it is rectified and applied to a time delay network consisting of capacitor C1 and resistor R1 via the terminal A for the positive potential and B for the negative potential. The positive potential from the rectifier is applied to the emitter E of a unijunction transistor UJT, while the negative potential is applied to the base B1 via the windings between terminals 101 and 102 of a bistable relay RLY.

Figure 3:
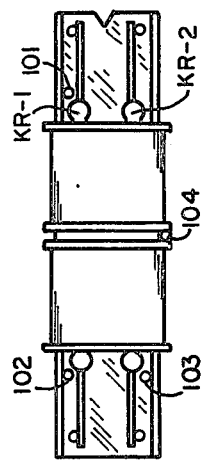
FIG. 3 shows a plan view of the bistable relay used in the invention.

The bistable correed relay shown in FIG. 3 consists functionally of two magnetic latching reed capsules and the energizing windings. The windings consist of one common winding between terminals 102 and 104, one set winding between terminals 101 and 104, and one reset winding between terminals 103 and 104. The common winding and the set winding each contain an equal number of turns and are wound in the same direction. By pulsing these two windings in series, from terminal 101 to 102 or vice verse, the contacts are set (closed).

The reset winding is larger than the set winding and wound in the opposite direction. By pulsing the common winding and the reset winding in series, from terminal 103 to terminal 102 or vice versa, the contacts are (opened). The schematic of the correed showing the winding interconnections is included in both FIGS. 1 and 2. This relay is further described in U.S. Pat. No. 4,063,205 issued Dec. 13, 1977.

When the turn on voltage of the unijunction is reached a current is passed through the set windings. This current is conducted through the path from the +20 volt terminal at the right of the figure to terminal 102 through the common winding to terminal 104, the set winding to terminal 101, base B1 to B2 of the unijunction transistor and resistor R8 to the −20 volt terminal. The 20 volt source is normally a part of the teletypewriter assembly. This current is sufficient to set the correeds to their operated state, closing contacts KR1 and KR2. At contacts KR1 a path is closed to the trigger of a triac Z4 by connecting it via resistors R9 and R10 to the common lead of the motor circuit. The capacitor C2 and the resistor R9 serve as an effective transient suppression circuit. With the trigger so connected the triac is switched to its conductive state to thus complete the A.C. circuit to operate the motor of the teletypewriter. The motor is thus switched to its operating state and the teletypewriter is now conditioned to receive data.

Upon termination of transmission the message will carry an end of transmission code which causes the teletypewriter to momentarily open the contacts marked slot 29. This action removes the shunt from the reset winding permitting a current to pass therethrough and resistor R-2 to reset the bistable contacts.

Figure 2:
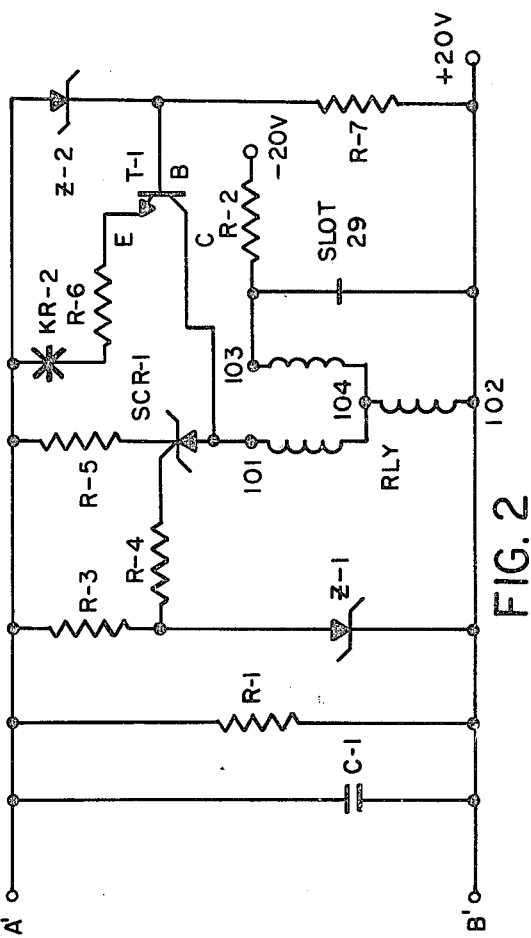
FIG. 2 shows in schematic form an alternate form of the detector circuit useable in the invention.

The circuit of FIG. 2 shows an alternate method of controlling the bistable relay. It like the previous circuit is connected to the rectifier BR output at terminals A and B. A time delay network consisting of capacitor C1' and resistor R1' and a voltage divider consisting of resistor R3 and a zener diode Z1 are connected across the input. The voltage derived from this voltage divider is conducted via resistor R4 to the gate electrode of a silicon controlled rectifier SCR1. The silicon controlled rectifier is also connected across the input terminals in a series path including the set and common windings of the bistable relay coil terminals 102 to 101 to the anode of the silicon controlled rectifier, and from the cathode of the silicon controlled rectifier through resistor R5 to the positive input conductor. Thus the ringing current from the line, rectified at the rectifier bridge BR creates a voltage across the voltage divider sufficient to gate the silicon controlled rectifier to its conductive state, to pass a current through the set winding to operate the associated contacts. In this application one of the contact sets KR2 are used to prepare a knockdown circuit for the silicon controlled rectifier SCR1. This circuit consists of an NPN transistor T1. The base of this transistor is biased from the mid-point of a voltage divider consisting of zener diode Z2 and resistor R7 connected to the base. While the collector is connected to terminal 101 of the relay RLY. The emitter is connected to the positive input conductor via resistor R6 and the closed contacts KR2. This shunt across the silicon controlled rectifier SCR1 thus effects its knockdown. The release of the circuit is identical to the first described embodiment.

What is claimed is:

1. In a control arrangement for conditioning a remote teletypewriter terminal via a DC communication line for receiving data by the application of a ringing current to said line, wherein said teletypewriter includes an alternating current motor operable from a local commercial AC source: a means at said terminal for enabling said teletypewriter comprising;

a bistable relay having a first and a second winding means effective for placing said relay in a first or a second stable state upon energization;

a ringing current detection means operatively connected to said line comprising;

a rectifier means having an output and an input which is connected to the line conductors of said line;

a resistor capacitor time delay network connected to the output of said rectifier means;

a unijunction transistor having a first and a second base and an emitter which latter is connected to one side of said time delay network;

a source of direct current having a positive and a negative output terminal;

said first base connected via said first winding means to the other side of said time delay network and said positive terminal of said direct current source, said second base connected via a resistor to said negative terminal of said direct current source, whereby upon the application of the rectified ringing current to said emitter said unijunction transistor is rendered conductive to pass a current through said first winding means to thereby operate said relay; and said relay effective upon operation to said first stable state to connect said motor to said commercial AC source, whereby said teletypewriter is in condition to receive data.

2. In a control arrangement for conditioning a remote teletypewriter terminal via a DC communication line for receiving data by the application of a ringing current to said line, wherein said teletypewriter includes an alternating current motor operable from a local commercial AC source: a means at said terminal for enabling said teletypewriter comprising;

a bistable relay having a first and a second winding means respectively effective upon energization to place said relay in a first or a second stable state;

a ringing current detection means operatively connected to said line comprising;

a rectifier means having an output and an input which is connected to the line conductors of said line;

a resistor capacitor time delay network connected to the output of said rectifier means;

a voltage divider including a tap connected across the output of said rectifier means;

a source of direct current having a positive and a negative output;

a silicon controlled rectifier having a gate electrode, a cathode and an anode, said anode connected via said first winding means to the one side of said time delay network and said positive output of said direct current source;

said voltage divider tap connected via a resistor to said gate, said cathode connected to another side of said time delay network and rectifier output, whereby said silicon controlled rectifier is fired to operate said relay to said first state in response to the application of ringing current to said line; and said relay effective upon operation to said first stable state to connect said motor to said commercial AC source, whereby said teletypewriter is in condition to receive data.

* * * * *